(12) United States Patent
Seo et al.

(10) Patent No.: US 10,326,517 B2
(45) Date of Patent: Jun. 18, 2019

(54) METHOD FOR RELAYING COMMUNICATION IN WIRELESS COMMUNICATION SYSTEM AND DEVICE FOR PERFORMING SAME

(71) Applicant: LG ELECTRONICS INC., Seoul (KR)

(72) Inventors: Inkwon Seo, Seoul (KR); Kijun Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 15/502,982

(22) PCT Filed: Aug. 25, 2015

(86) PCT No.: PCT/KR2015/008863
§ 371 (c)(1),
(2) Date: Feb. 9, 2017

(87) PCT Pub. No.: WO2016/032201
PCT Pub. Date: Mar. 3, 2016

(65) Prior Publication Data
US 2017/0244469 A1    Aug. 24, 2017

Related U.S. Application Data

(60) Provisional application No. 62/042,802, filed on Aug. 28, 2014, provisional application No. 62/098,319, filed on Dec. 30, 2014.

(51) Int. Cl.
*H04B 7/14* (2006.01)
*H04W 68/02* (2009.01)
(Continued)

(52) U.S. Cl.
CPC .......... *H04B 7/14* (2013.01); *H04B 7/15507* (2013.01); *H04W 68/02* (2013.01);
(Continued)

(58) Field of Classification Search
None
See application file for complete search history.

(56) References Cited

U.S. PATENT DOCUMENTS

| 9,894,591 B2 * | 2/2018 | Chung | H04W 76/14 |
| 2010/0151865 A1 * | 6/2010 | Camp, Jr. | H04W 72/046 455/445 |

(Continued)

FOREIGN PATENT DOCUMENTS

| WO | 2013111104 | 8/2013 |
| WO | 2014104627 | 7/2014 |

OTHER PUBLICATIONS

PCT International Application No. PCT/KR2015/008863, Notification of Transmittal of the International Search Report and the Written Opinion of the International Searching Authority, or Declaration dated Jan. 26, 2016, 9 pages.

(Continued)

*Primary Examiner* — Noel R Beharry
*Assistant Examiner* — Lionel Preval
(74) *Attorney, Agent, or Firm* — Lee, Hong, Degerman, Kang & Waimey

(57) ABSTRACT

A method for a first device to device (D2D) user equipment supporting D2D communication to relay the communication of a second D2D user equipment, according to one embodiment of the present invention, comprises the steps of: detecting a broadcast signal of a base station on the second D2D user equipment; and, if the second D2D user equipment is positioned outside the coverage of the base station and neighbors the first D2D user equipment, the first D2D (Continued)

user equipment responding to the broadcast signal on the second D2D user equipment, wherein the response of the first D2D user equipment is for reporting that the first D2D user equipment can relay communication between the base station and the second D2D user equipment.

12 Claims, 11 Drawing Sheets

(51) Int. Cl.
| | |
|---|---|
| *H04W 88/04* | (2009.01) |
| *H04W 76/14* | (2018.01) |
| *H04W 72/00* | (2009.01) |
| *H04B 7/155* | (2006.01) |
| *H04W 8/00* | (2009.01) |
| *H04W 68/00* | (2009.01) |

(52) U.S. Cl.
 CPC ......... *H04W 72/005* (2013.01); *H04W 76/14* (2018.02); *H04W 88/04* (2013.01); *H04W 8/005* (2013.01); *H04W 68/005* (2013.01)

(56) References Cited

U.S. PATENT DOCUMENTS

| | | | |
|---|---|---|---|
| 2011/0134827 A1 | 6/2011 | Hooli et al. | |
| 2014/0171062 A1* | 6/2014 | Fallgren | H04W 40/22 455/422.1 |
| 2014/0307611 A1* | 10/2014 | Tesanovic | H04W 76/14 370/312 |
| 2017/0055265 A1* | 2/2017 | Wei | H04W 72/0453 |

OTHER PUBLICATIONS

Ericsson, "On Scheduling Assignments and Receiver Behaviour", R1-141391, 3GPP TSG RAN WG1 Meeting #76bis, Apr. 2014, 6 pages.

Asadi, A. et al., "WiFi Direct and LTE D2D in Action", Institute IMDEA Networks, IEEE, Nov. 2013, 8 pages.

* cited by examiner

FIG. 1
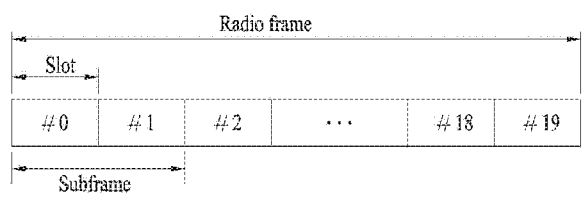
(a)
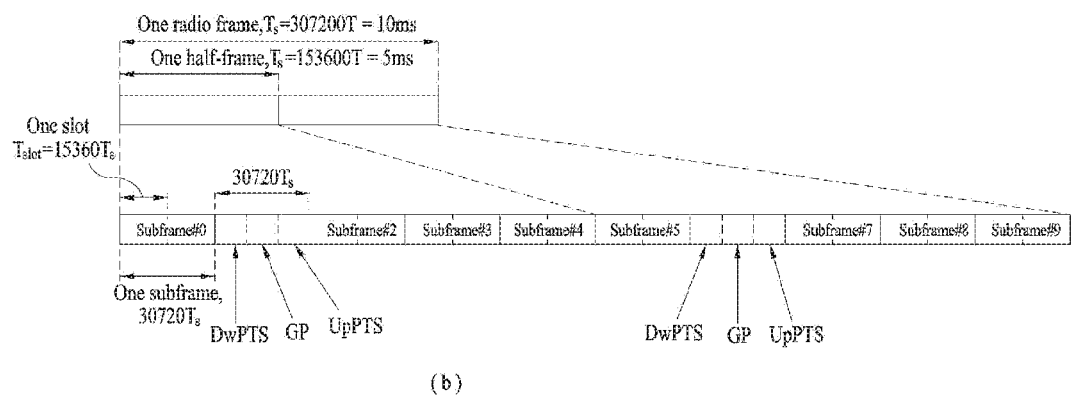
(b)

METHOD FOR RELAYING COMMUNICATION IN WIRELESS COMMUNICATION SYSTEM AND DEVICE FOR PERFORMING SAME

CROSS-REFERENCE TO RELATED APPLICATIONS

This application is the National Stage filing under 35 U.S.C. 371 of International Application No. PCT/KR2015/008863, filed on Aug. 25, 2015, which claims the benefit of U.S. Provisional Application Nos. 62/042,802, filed on Aug. 28, 2014 and 62/098,319, filed on Dec. 30, 2014, the contents of which are all hereby incorporated by reference herein in their entirety.

TECHNICAL FIELD

The present invention relates to a wireless communication system, and more particularly, to a method of performing a relaying using device-to-device (D2D) communication and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

One technical task of the present invention is to provide a relaying user equipment and procedure thereof, by which communication of a user equipment can be relayed efficiently with high reliability through D2D communication.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method for a first device-to-device (D2D) user equipment supportive of D2D communication to relay a communication of a second D2D user equipment, including detecting a broadcast signal of a base station for the second D2D user equipment and responding, by the first D2D user equipment, to the broadcast signal for the second D2D user equipment when the second D2D user equipment is located out of coverage of the base station and is adjacent to the first D2D user equipment, wherein the response of the first D2D user equipment is to report that the first D2D user equipment is able to relay the communication between the base station and the second D2D user equipment.

Preferably, the method may further include generating a list of D2D user equipments located out of the coverage of the base station among neighbor D2D user equipments of the first D2D user equipment and checking whether the second D2D user equipment is located output of the coverage of the base station and is adjacent to the first D2D user equipment based on the list.

More preferably, in the generating the list, if a measurement result of a D2D signal received by the first D2D user equipment satisfies a threshold and the D2D signal indicates out-of-coverage, a D2D user equipment that transmitted the D2D signal may be included in the list.

More preferably, if a D2D signal is not detected within a predetermined time or a measurement result of the D2D signal does not satisfy a threshold, a corresponding D2D user equipment may be deleted from the list.

Moreover, the broadcast signal may be transmitted through reserved bits of physical broadcast channel (PBCH) which is repeated for every 10 ms interval within 40 ms periodicity and the reserved bits of the PBCH can be changed for every 10 ms interval.

Preferably, the broadcast signal may correspond to a paging message containing a first type identifier of the second D2D user equipment.

More preferably, the detecting the broadcast signal may include detecting physical downlink control channel (PDCCH) masked with a second type identifier of the second D2D user equipment and detecting the paging message containing the first type identifier of the second D2D user equipment from a resource region indicated by the PDCCH.

More preferably, the detecting the broadcast signal may include monitoring paging messages for the D2D user equipments included in the list based on identifiers of the D2D user equipments included in the list.

More preferably, a paging timing for the first D2D user equipment may be UE-specific and a paging timing for the second D2D user equipment may be cell-specific or group-specific.

Moreover, the response of the first D2D user equipment may further include a result of measuring a D2D signal received from the second D2D user equipment.

More preferably, the result of measuring the D2D signal may be used to select a user equipment to relay the second D2D user equipment among a plurality of relaying user equipment candidates including the first D2D user equipment.

Moreover, the method may further include establishing a provisional connection to the second D2D user equipment and exchanging a D2D signal with the second D2D user equipment periodically to maintain the provisional connection.

More preferably, the detecting the broadcast signal may include receiving a paging message for the second D2D user equipment based on information on a paging timing of the second D2D user equipment acquired through the provisional connection.

Moreover, the method may further include relaying the detected broadcast signal to the second D2D user equipment through the D2D communication with the second D2D user equipment.

In another technical aspect of the present invention, provided herein is a first D2D user equipment supportive of D2D communication, including a receiver, a transmitter, and a processor detecting a broadcast signal of a base station for a second D2D user equipment through the receiver, responding to the broadcast signal for the second D2D user equipment through the transmitter when the second D2D user equipment is located out of coverage of the base station and is adjacent to the first D2D user equipment, wherein the response is to report that the first D2D user equipment is able to relay a communication between the base station and the second D2D user equipment.

Advantageous Effects

According to one embodiment of the present invention, as a relaying user equipment candidate detects and responds to a broadcast signal of a base station for a user equipment out of coverage, a relaying user equipment supposed to relay communication of the out-of-coverage user equipment can be selected with high reliability and the selected relaying user equipment can relay the communication of the user equipment efficiently through D2D communication.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 1 is a diagram showing the structure of a radio frame.

MODE FOR INVENTION

Figure 2:
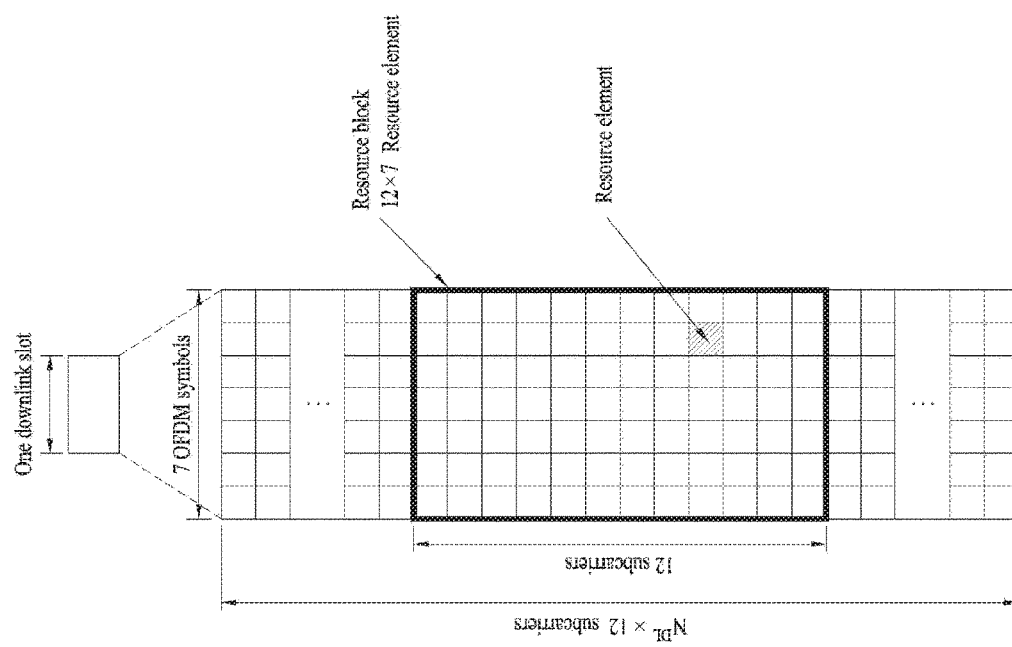
FIG. 2 is a diagram showing a resource grid in a downlink slot.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
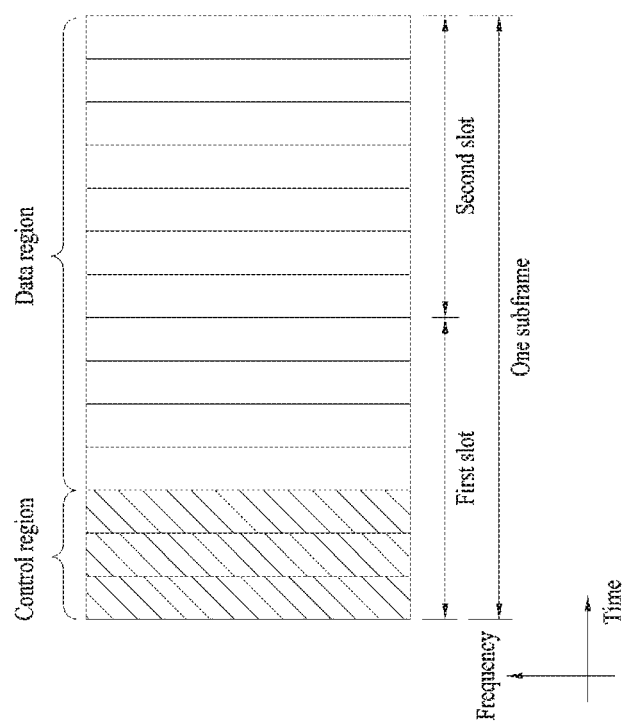
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
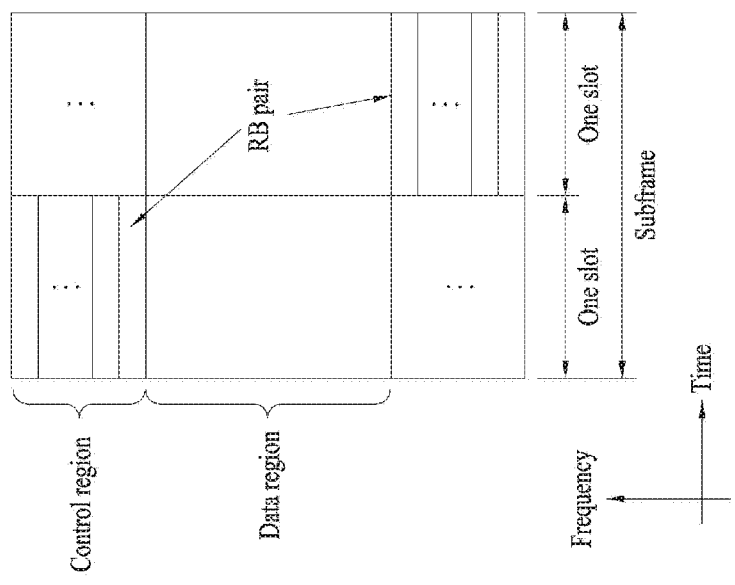
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:
i) Cell-specific Reference Signal (CRS) shared among all UEs of a cell;
ii) UE-specific RS dedicated to a specific UE;
iii) DM-RS used for coherent demodulation of a PDSCH, when the PDSCH is transmitted;
iv) Channel State Information-Reference Signal (CSI-RS) carrying CSI, when downlink DM-RSs are transmitted;
v) Multimedia Broadcast Single Frequency Network (MBSFN) RS used for coherent demodulation of a signal transmitted in MBSFN mode; and
vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
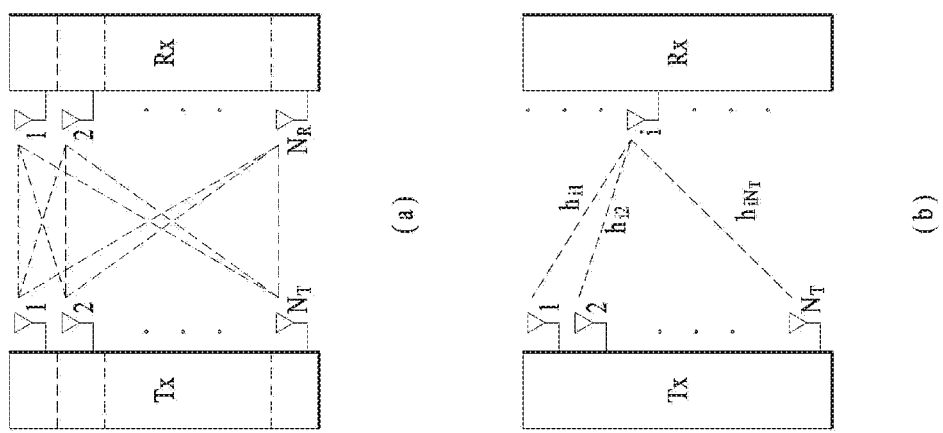
FIG. 5 is a diagram showing the configuration of a wireless communication system having multiple antennas.

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x =$$ [Equation 5]

$$\begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T=[h_{i1},h_{i2},\ldots,h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

PSS (Primary Synchronous Signal)/SSS (Secondary Synchronous Signal)

Figure 6:
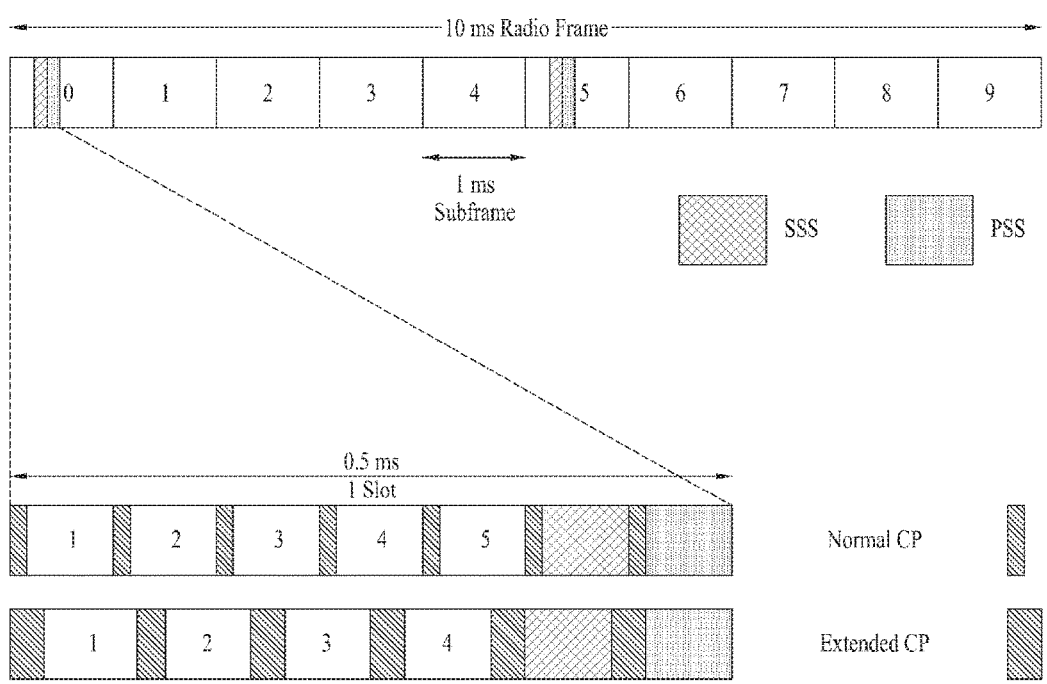
FIG. 6 is a diagram of PSS and SSS of a 3GPP system.

FIG. 6 is a diagram for explaining a PSS and an SSS corresponding to synchronization signals used for a cell search in LTE/LTE-A system. Before the PSS and the SSS are explained, a cell search is explained. When a user equipment initially accesses a cell, the cell search is performed for a case of performing a handover from the currently accessed cell to a different cell, a case of reselecting a cell or the like. The cell search may include acquisition of frequency and symbol synchronization for a cell, acquisition of downlink frame synchronization for a cell and determination of a cell identifier (ID). One cell group consists of three cell identifiers and there may exist 168 cell groups.

An eNB transmits a PSS and an SSS to perform a cell search. A user equipments obtains 5 ms timing of a cell by detecting the PSS and may be able to know a cell identifier included in a cell group. And, the user equipment is able to know radio frame timing and a cell group by detecting the SSS.

Referring to FIG. 6, a PSS is transmitted in a $0^{th}$ and a $5^{th}$ subframe. More specifically, the PSS is transmitted on the last ODFM symbol of a first slot of the $0^{th}$ subframe and the last OFDM symbol of a first slot of the $5^{th}$ subframe, respectively. And, the SSS is transmitted on the last but one OFDM symbol of the first slot of the $0^{th}$ subframe and the last but one OFDM symbol of the first slot of the $5^{th}$ subframe, respectively. In particular, the SSS is transmitted on an OFDM symbol right before an OFDM symbol on which the PSS is transmitted. The aforementioned transmission timing corresponds to a FDD case. In case of TDD, the PSS is transmitted on a third symbol of the $1^{st}$ subframe and a third symbol of a $6^{th}$ subframe (i.e., DwPTS) and the SSS is transmitted on the last symbol of a $0^{th}$ subframe and the last symbol of a $5^{th}$ subframe. In particular, the SSS is transmitted on a symbol preceding as many as 3 symbols of a symbol on which the PSS is transmitted in the TDD.

The PSS corresponds to a Zadoff-Chu sequence of a length of 63. The PSS is actually transmitted on 73 center subcarriers (72 subcarriers except a DC subcarrier, i.e., 6 RBs) of a system frequency bandwidth in a manner that 0 is padding to both ends of the sequence. The SSS consists of a sequence of a length of 62 in a manner that two sequences each of which has a length of 31 are frequency-interleaved. Similar to the PSS, the SSS is transmitted on the center 72 subcarriers of the whole system bandwidth.

PBCH (Physical Broadcast Channel)

Figure 7:
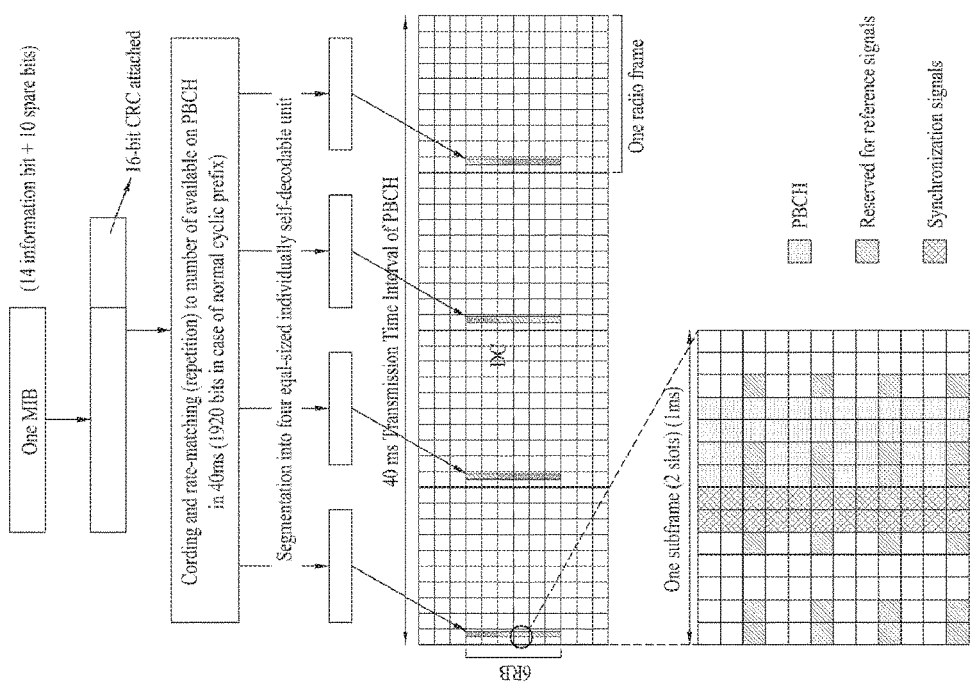
FIG. 7 is a diagram of PBCH of a 3GPP system.

FIG. 7 is a diagram for explaining PBCH. The PBCH corresponds to a channel on which system information corresponding to a master information block (MIB) is transmitted. The PBCH is used to obtain system information after a user equipment obtains synchronization and a cell identifier via the aforementioned PSS/SSS. In this case, downlink cell bandwidth information, PHICH configuration information, a subframe number (a system frame number (SFN)) and the like can be included in the MIB.

As shown in FIG. 7, one MIB transport block is transmitted via a first subframe in each of 4 consecutive radio frames. More specifically, PBCH is transmitted on first 4 OFDM symbols of a second slot of a $0^{th}$ subframe in the 4 consecutive radio frames. Hence, the PBCH configured to transmit a MIB is transmitted with an interval of 40 ms. The PBCH is transmitted on center 72 subcarriers of a whole bandwidth in frequency axis. The center 72 subcarriers correspond to 6 RBs corresponding to a smallest downlink bandwidth. This is intended to make a user equipment decode BCH without any problem although the user equipment does not know a size of the whole system bandwidth.

Initial Access Procedure

Figure 8:
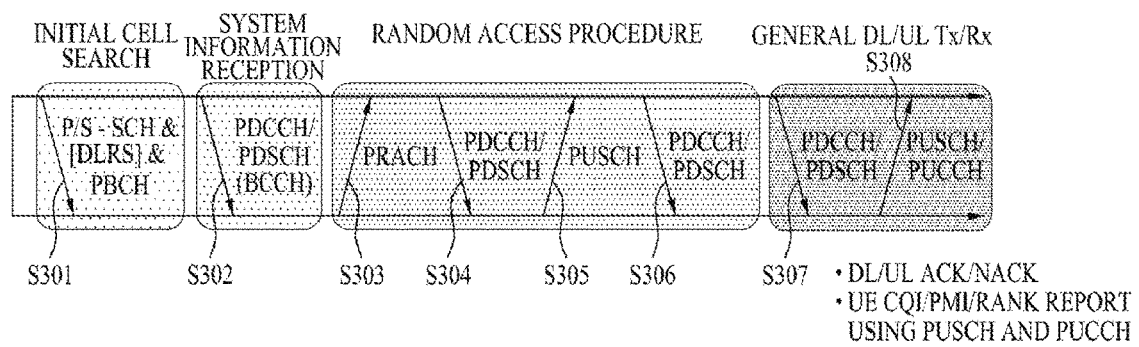
FIG. 8 is a diagram to describe an initial access procedure and signal transceiving method of a 3GPP system.

FIG. 8 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3GPP LTE system, the UE may transmit the above-mentioned control informations such as CQI, PMI, RI and the like via PUSCH and/or PUCCH.

D2D (Device to Device) Communication Environment

D2D communication means a direct communication between UEs, and a term 'D2D' may be substituted with or used interchangeably with a term 'sidelink'. D2D UE means US supportive of D2D. UE may mean D2D UE unless legacy UE is mentioned specially.

In D2D communication, the coverage of an eNB can be increased through a relay UE or a coverage hole and the like can be overcome. According to embodiments of the present invention, for a communication between an eNB and a UE unable to directly receive a signal from the eNB, methods of selecting a relay UE are proposed. The following description is made by focusing on a method for relaying a communication between an eNB and a UE, by which the present invention is non-limited. And, embodiments of the present invention are applicable for a communication between UEs that configure a D2D pair.

Figure 9:
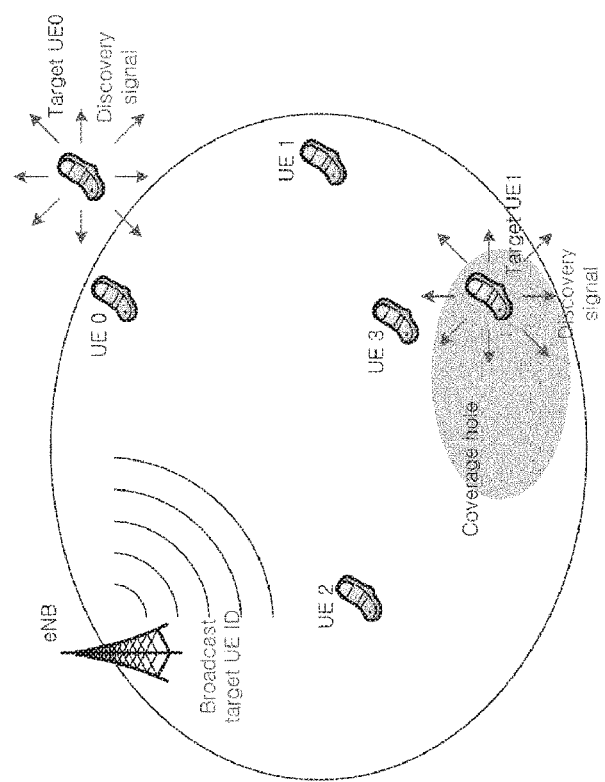
FIG. 9 is a diagram to describe D2D communication according to one embodiment of the present invention.

FIG. 9 is a diagram to describe D2D communication according to one embodiment of the present invention.

Referring to FIG. 9, Target UE is D2D UE requiring a relaying of a relay UE. Target UE0 is assumed as located out of a coverage of an eNB. And, Target UE1 is assumed as located at a coverage hole within the coverage. Hence, the Target UEs (Target UE0, Target UE1) are unable to perform direct communication with the eNB, and a relay UE is necessary for the communication with the eNB.

If Target UEs are D2D UEs supportive of D2D, the Target UEs send discovery signals at a specific timing. UEs located around the Target UEs detect the discovery signals and are then aware that the Target UEs are located around them. Meanwhile, signals sent by the Target UEs are non-limited by the discovery signals. Signals (e.g., Scheduling Assignment, D2D data, etc.) containing or inferring IDs (or informations corresponding to IDs) of the Target UEs can be sent from the Target UEs.

Embodiment for D2D UE Supportive of D2D Relaying to Search for Target UE

A D2D UE capable of providing a D2D relaying for a target UE is named a relay UE candidate. Relay UE candidates can perform measurements of a D2D signal sent by a neighboring target UE. The D2D signal sent by the target UE may include at least one of D2DSS, discovery signal, scheduling assignment (SA), and D2D data signal, by which the present invention is non-limited.

The measurement of D2D signal may include a measurement of a received power in a given resource region (e.g., discovery resource unit, SA unit). The measurement of D2D signal may include a measurement of a received power (e.g., RSRP (reference signal received power)) of a reference signal (RS) or a known sequence or a measurement of correlation or the like.

If a measurement result of D2D signal exceeds a prescribed threshold, a relay UE candidate generates a list (e.g., neighbor UE list) of UE IDs (e.g., UEID or information corresponding to ID) of target UEs having sent the D2D signals exceeding the threshold. In the generated neighbor UE list, a measurement result value and information on a measurement performed timing may be further contained as well as target UE ID.

For the management and update of the neighbor UE list, the relay UE candidate may set a timer. For instance, if a predetermined time expires from a measurement timing or a D2D signal is not detected over a predetermined time from a timing of a last detection of a D2D signal, an ID of the target UE having sent the D2D signal may be deleted from the neighbor UE list. For instance, if a D2D signal measurement result exceeds a threshold, an ID of a target UE having sent a corresponding D2D signal may exist on the neighbor UE list during a predetermined time only.

Meanwhile, if the relay UE candidate performs measurement of D2D signal periodically and an instantaneous or average value of a measurement result of the D2D signal becomes lower than the threshold, the relay UE candidate may delete an ID of a target UE having sent the corresponding D2D signal from the neighbor UE list.

The neighbor UE list generated and managed by the relay UE candidate may be regarded as a list of other D2D UEs with which the relay UE candidate can perform D2D communication.

Moreover, a target UE inclusive in the neighbor UE list may be limited to a target UE out of the coverage of a network. The relay UE candidate may determine whether a target UE is located in the coverage of the network through a D2D signal sent by the target UE. For instance, D2DSS sent by a target UE may be sorted into D2DSS for in-coverage or D2DSS for out-of-coverage. The D2DSS for in-coverage and the D2DSS for out-of-coverage may include Zadoff-Chu sequences generated on the basis of different root indexes. In particular, the D2DSS for in-coverage may be generated from a first root index, while the D2DSS for out-of-coverage may be generated from a second root index. On the other hand, the D2D signal sent by the target UE may further include information indicating whether the target UE is located in the coverage.

Embodiment for Data Source for Target UE to Search for Relay UE

A data source (e.g., eNB, another D2D UE, etc.) intending to send data to a target UE requires a relay UE that will relay a communication between the target UE and the data source. In order to search for a D2D UE operable as a relay UE, the data source may broadcast or multicast an ID of the target UE in the coverage of the data source. For clarity of the description, the data source is assumed as the eNB, by which the appended claims and their equivalents are non-limited.

Each relay UE candidate in an eNB may inform the eNB that the corresponding relay UE candidate can relay a communication between the target UE and the eNB if a target UE ID broadcasted by an eNB is included in a neighbor UE list of the corresponding relay UE candidate. For instance, the relay UE candidate may send information indicating that the target UE exists around the relay UE candidate and a result of measurement of D2D signal from the target UE to the eNB. Based on the D2D measurement result, the eNB may select a relay UE candidate to relay to the target UE.

As methods for an eNB to broadcast or multicast an ID of a target UE, (1) an embodiment using PBCH and (2) an embodiment using paging are described as follows.

(1) Embodiment Using PBCH

As one of methods of broadcasting a target UE ID, an eNB may use PBCH.

According to a related art method, information of PBCH may be changed by 40 ms periodicity and PBCH of the same information is repeatedly sent multiple times by 10 ms intervals within the 40 ms periodicity. Yet, an RV index (redundancy version index) of the PBCH may be set different for each PBCH transmission of 10 ms interval.

According to one embodiment of the present invention, a target UE ID may be sent on reserved bits in information of PBCH. In order to increment a count of broadcasting a target UE ID or change the target UE ID, the reserved bits in the information of PBCH may be typically updated in 10 ms interval for repeatedly sending the PBCH. For instance, the existing informations of PBCH (i.e., system bandwidth, PHICH size and/or SFN (system frame number) information, etc.) maintain an existing scheme of being updated by 40 ms periods and the target UE ID required for the selection of the relay UE may be updated by 10 ms period.

In case of a legacy UE failing to support D2D communication, the reserved bits of PBCH are set not to be used. Although new information is added to the reserved bits of PBCH or the reserved bits of PBCH are updated by 10 ms periods, since an update period of the existing information of PBCH is maintained as 40 ms, subordinate compatibility with the legacy UE can be secured. On the other hand, since the target UE ID information newly added through the reserved bits of PBCH can be updated by 10 ms periods, the eNB may schedule the broadcasting of the target UE ID more flexibly and dynamically.

(2) Embodiment Using Paging

An eNB may use a paging signal as one of methods for broadcasting or multicasting a target UE ID.

Table 1 shows an existing paging message defined in an RRC (radio resource control) layer. The paging message shown in Table 1 may be used for such usages as system information change notification, EETTWSS (earthquake and tsunami warning system) notification, and CMAS (commercial mobile alert service) notification.

cordList) intact. Yet, in 'PagingRecordList' of a paging message indicated by PDCCH masked with T-RNTI, 'ue-Identity' is set to a target UE ID.

If PDCCH masked with T-RNTI is detected, each relay UE candidate can determine whether a target UE exists around the corresponding relay UE candidate by comparing a target UE ID contained in a paging message with a neighbor UE list of its own. In order to simplify a format of a paging message, the rest of IEs (information elements) (e.g., 'systemInfoModification', 'etws-Indication', etc.) except 'PagingRecordList' may be removed.

TABLE 1

```
-- ANS1START
Paging ::=                SEQUENCE {
      pagingRecordList             PagingRecordList          OPTIONAL, -- Need ON
      systemInfoModification       ENUMERATED {true}         OPTIONAL, -- Need ON
      etws-Indication              ENUMERATED {true}         OPTIONAL, -- Need ON
      conCriticalExtension         Paging-v890-IEs           OPTIONAL  -- Need OP
}
Paging-v890-IEs ::=       SEQUENCE {
      lateNonCriticalExtension     OCTET STRING              OPTIONAL, -- Need OP
      conCriticalExtension         Paging-v920-IEs           OPTIONAL  -- Need OP
}
Paging-v920-IEs ::=       SEQUENCE {
      cmas-Indication-r9           ENUMERATED {true}         OPTIONAL, -- Need ON
      conCriticalExtension         Paging-v1130-IEs          OPTIONAL  -- Need OP
}
Paging-v1130-IEs ::=      SEQUENCE {
      eab-ParamModification-r11    ENUMERATED {true}         OPTIONAL, -- Need ON
      conCriticalExtension         SEQUENCE { }              OPTIONAL  -- Need OP
}
PagingRecordList ::=      SEQUENCE (SIZE (1..maxPageRec)) OF PagingRecord
PagingRecord ::=          SEQUENCE {
      ue-Identity                  PagingUE-Identity,
      cn-Domain                    ENUMERATED        {ps, cs},
      ...
}
PagingUE-Identity ::=     CHOICE {
      s-TMSI                       S-TMSI,
      imsi                         IMSI,
      ...
}
IMSI ::=                  SEQUENCE (SIZE (6..21) OF IMSI-Digit
IMSI-Digit ::=            INTEGER (0..9)
--ASN1STOP
```

If a UE receives the paging message shown in Table 1 and then detects PDCCH masked with P-RNTI (paging-radio network temporary identifier) assigned to the UE, the UE decodes the paging message included in PDSCH indicated by the PDCCH. Thereafter, the UE performs an operation according to the paging message. For instance, if 'ue-Identity' (e.g., IMSI) in 'PagingRecord' of the paging message is associated with UEID of a UE corresponding to RRC_IDLE, the UE reports 'ue-Identity' and 'cn-domain' to an upper layer. Moreover, if 'systemInfoModification' in the paging message is 'true', the UE recognizes that system information has been changed and then performs a system information acquisition procedure.

(2)-i. Embodiment of Defining New RNTI

According to one embodiment of the present invention, in order to send a target UE ID on a paging signal, a new RNTI (e.g., T-RNTI (targetUE-RNTI)) can be defined.

In order to minimize influence on an existing system and secure subordinate compatibility, T-RNTI may be newly defined and a physical format of a T-RNTI carried paging signal may use an existing paging message (e.g., PagingRe- According to another embodiment, through the reserved bits in a paging message corresponding to T-RNTI, a target UE ID may be sent.

(2)-ii. Embodiment of Adding Target UE ID to Information Indicated by P-RNTI According to another embodiment of the present invention, a target UE ID can be added to a paging message corresponding to P-RNTI despite reusing the P-RNTI assigned to a relay UE candidate.

As a method of adding a target UE ID to a paging message, it is able to reuse the 'existing PagingRecordList' and subordinate IEs of the existing 'PagingRecordList'. Yet, in order to distinguish 'PagingRecordList' for paging a relay UE candidate from 'PagingRecordList' for paging a target UE, a name of the 'PagingRecordList' for paging the target UE may be set to 'TargetRecordList'.

Hence, having received the paging message, the relay UE candidate checks whether a UE ID of its own is contained in 'PagingRecordList' and also checks whether a target UE ID is contained in 'TargetRecordList'.

Meanwhile, relay UE candidates preferably report neighbor UE lists generated by themselves to an eNB before paging. The eNB compares the neighbor UE list reported by the relay UE candidate and is then able to send a paging message using a P-RNTI of the relay UE candidate having sent the neighbor UE list containing an ID of a target UE.

(2)-iii. Embodiment of Monitoring Paging for Target UE

According to further embodiment of the present invention, a relay UE candidate overhears a paging message sent to a target UE. For instance, the relay UE candidate may monitor both a paging message sent in its paging period and a paging message sent in a paging period of the target UE. If a target UE ID is contained in a neighbor UE list generated by the relay UE candidate, the relay UE candidate reports an eNB that the relay UE candidate is able to relay the target UE.

For another example, a relay UE candidate monitors a paging message sent in its paging period like an existing method and also checks whether a target UE ID contained in a neighbor UE list or a target UE ID set to be relayed by the relay UE candidate exists in 'ue-Identity' in the paging message. If the target UE ID is detected from the paging message, the relay UE candidate sends an eNB a report indicating that a D2D connection to the target UE is available and that the relay UE candidate will perform a relaying operation.

Meanwhile, an operation of monitoring a paging for a target UE may be restricted to be performed only if the target UE is out of coverage.

A response to a paging message may be sorted into one of two types. One is a response made by a UE becoming a paging target, and the other is a response from a relay UE candidate capable of relaying a paging target. If receiving both of the responses of the two types, an eNB can give a higher priority to the response from the UE becoming the paging target. For instance, if a target UE directly makes a response to a paging, a relaying of a relay UE candidate is not necessary. Hence, a higher priority is given to the direct response of the target UE.

Embodiment for Paging Timing Settings in Embodiments '(2)-i' to '(2)-iii'

According to the aforementioned embodiments '(2)-i'. '(2)-ii' and '(2)-iii', a transmission timing of a paging message for broadcasting a target UE ID may be set different from that of a general paging message.

Generally, a paging timing is determined by paging parameters including a cell-specific paging cycle (i.e., default paging cycle) parameter, a UE-specific paging cycle parameter (via dedicated signaling) and a UE-ID (e.g., IMSI mod 1024). Hence, although a paging timing is calculated per UE, some UEs may have the same paging timing (e.g., UEs having the same dedicated signal and the same IMSI mode 1024).

If a paging message for broadcasting a target UE ID is sent using an existing paging timing, a target UE and a relay UE candidate may differ from each other in a paging timing. Hence, an eNB may page an ID of a target UE at a paging timing of each of relay UE candidates or separately set a common paging timing of relay UE candidates for the usage of broadcasting the ID of the target UE. The common paging timing of the relay UE candidates may be set cell-specific or group-specific to a group of the relay UE candidates.

In case of sending a paging message containing an ID of a target UE at a paging timing of each of relay UE candidates according to one of the two methods, since the ID of the target UE is repeatedly sent at the paging timings of the different relay UE candidates, it is disadvantageous that lots of radio resources are used to send the ID of the target UE. Yet, in aspect of an individual relay UE candidate, since it is necessary to check an ID of a target UE at a paging timing of the corresponding relay UE candidate only, it is advantageous that overhead for detection of a paging message is reduced.

If a common paging timing for a paging message containing an ID of a target UE is set for relay UE candidates, it is able to use a radio resource more efficiently than sending a paging message repeatedly.

An eNB can set a common paging timing for each relay UE candidate through higher layer signaling or the like. According to another embodiment, it may use a method of fixing parameters (e.g., UE ID) having a UE-specific attribute among parameters for determining a paging timing. The eNB signals a UE ID for a common paging timing. Relay UE candidates can acquire the common paging timing by inserting a UE ID signaled from the eNB into a general paging timing determination formula.

Embodiment for Operations of Relay UE Candidates in Embodiments '(2)-i' to '(2)-iii'

In the following description, procedures of relay UE candidates for the aforementioned embodiments '(2)-i'. '(2)-ii' and '(2)-iii' are explained. The aforementioned embodiments '(2)-i'. '(2)-ii' and '(2)-iii' may apply to both a relay UE candidate in RRC-IDLE state and a relay UE candidate in RRC-CONNECTED state. For instance, a relay UE candidate may perform a detection on a paging message for broadcasting a target UE ID irrespective of RRC_IDLE or RRC_CONNECTED.

Figure 10:
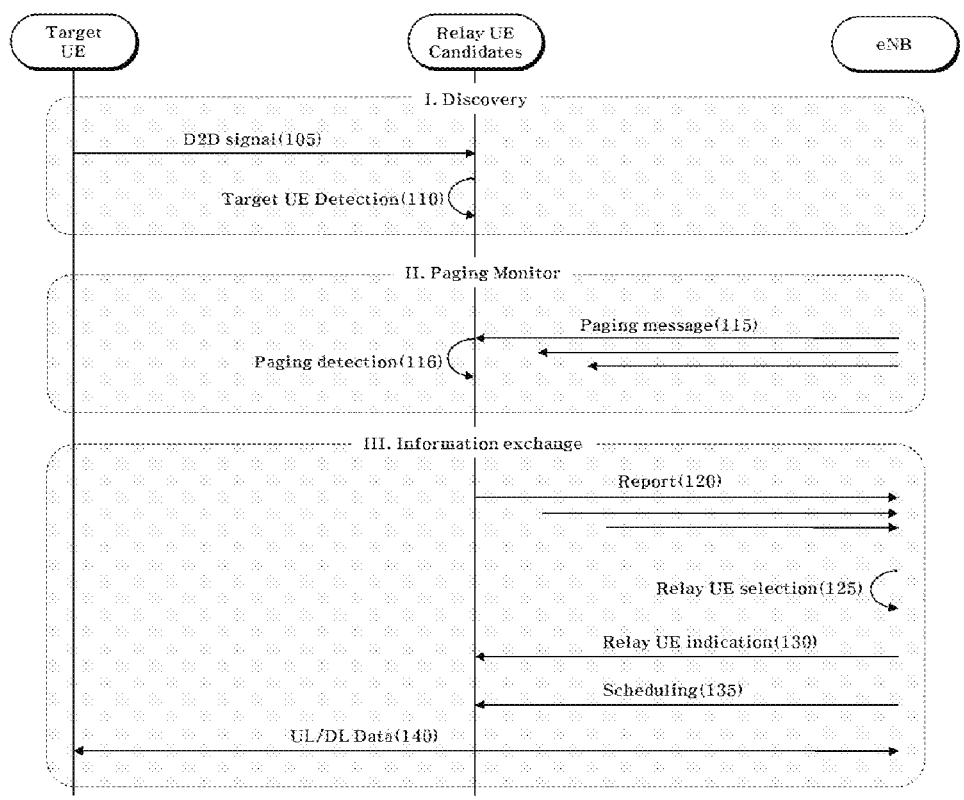
FIG. 10 is a diagram of a procedure of a relay UE candidate according to one embodiment of the present invention.

FIG. 10 is a diagram of a procedure of a relay UE candidate according to one embodiment of the present invention. In FIG. 10, a plurality of relay UE candidates may exist. And, the illustrated procedures may be performed by a plurality of the relay UE candidates.

Referring to FIG. 10, an operation of a relay UE candidate includes 'I. Discovery procedure', 'II. Paging monitoring procedure' and 'III. Procedure for exchanging information with eNB'.

First of all, a target UE sends a D2D signal [105]. The D2D signal is a signal indicating an ID of the target UE, and may include at least one of D2DSS, D2D discovery signal, D2D SA (scheduling assignment), D2D communication signal and RS for example. The RS may include at least one of DMRS for demodulation of D2D discovery signal, DMRS for demodulation of D2D SA and DMRS for demodulation of D2D communication signal.

A relay UE candidate located near the target UE detects the target UE based on the D2D signal sent by the target UE [110]. The relay UE candidate may save an ID of the target UE having sent the D2D signal satisfying a prescribed detection criterion, a D2D signal strength and the like to a neighbor UE list. For instance, the relay UE candidate can measure a D2D signal to detect the target UE. In the measurement of the D2D signal, at least one of a correlation value for the D2D signal, an RSSI (received signal strength indicator), an RSRP (reference signal received power) and an RSRQ (reference signal received quality). The RSRQ can be calculated according to a rate of RSSI and RSRP.

Meanwhile, a transmission period of a D2D discovery signal, SA or the like may be set to several tens of milliseconds (ms) or greater. Since a scheme of averaging the measured results after multiple D2D signal measurements consumes a time amounting to at least 'several tens of milliseconds X a count of measurements', it may not be appropriate for configuring a neighbor UE list. Hence, the D2D signal measurement for configuring the neighbor UE list may be limited to a resource unit corresponding to a single D2D transmission (i.e., one shot measurement). Or, according to a transmission period of a D2D signal or SA, a size of a measurement window may be variable. For instance, if a transmission period of D2D signal is smaller than 'k' ms, a relay UE candidate averages values measured in 2 subframes. If a transmission period of D2D signal is equal to or greater than 'k' ms, a relay UE candidate uses a value measured in a single subframe.

An eNB sends paging messages containing the target UE ID [1115].

Each of the relay UE candidates detects the paging message containing the target UE ID by monitoring the paging message according to each paging timing [116]. For instance, each of the relay UE candidates performs detection of the paging message based on PDCCH masked with T-RNTI of the target UE. If the PDCCH masked with the T-RNTI of the target UE is detected, each of the relay UE candidates compares the target UE ID contained in the paging message indicated by the PDCCH with the neighbor UE list, thereby checking whether the target UE desired by the eNB is located near the corresponding relay UE candidate.

Each of the relay UE candidates having been confirmed as located near the target UE desired by the eNB sends a report, which indicates that a relaying of the target UE is available, to the eNB [120]. The report may include the target UE ID and the D2D signal measurement result.

Having received the report indicating that the relaying is available from one relay UE candidate or two or more relay UE candidates, the eNB selects a relay UE that will relay the target UE from the relay UE candidates based on the reports [125]. For instance, if receiving the report of the RSRP of the D2D signal, the eNB can select a relay UE candidate having a greatest RSRP value as a relay UE.

The eNB sends the selected relay UE a signal instructing the selected relay UE to operate as the relay UE for the target UE [130].

The eNB sends scheduling information for the relaying of the target UE to the relay UE [135]. The scheduling information may include scheduling information for a communication between the eNB and the relay UE, e.g., resource allocation for cellular operation between the relay UE and the eNB. The scheduling information may include scheduling information for D2D communication between the relay UE and the target UE, e.g., resource allocation for D2D operation.

The eNB transceives UL/DL data with the target UE via the relay UE [140].

Embodiment for Reducing Delay According to Paging

Meanwhile, an eNB preferentially searches for a target UE through an existing paging procedure and is then able to perform a paging for broadcasting of a target UE ID by the aforementioned method using T-RNTI in case of no response from the target UE. In doing so, since the eNB performs the paging two times at least, a delay twice greater than that of an existing paging procedure may be generated.

As a method of reducing such a delay, a method of selecting a relay UE using an existing paging procedure only is proposed.

An eNB performs a paging on a target UE according to an existing paging procedure. Each of relay UE candidates in coverage of the eNB checks not only UE ID of its own in a paging message but also a target UE ID contained in a neighbor list.

If each of the relay UE candidates discovers its own UE ID from the paging message, it performs a general paging response procedure.

If the target UE ID contained in the neighbor UE list is discovered from the paging message, each of the relay UE candidates reports the eNB that the target UE can be relayed.

A link quality between the target UE and the corresponding relay UE candidate may be included in each of the reports of the relay UE candidates. The link quality is a result from measuring D2D signal from the target UE for example and may include at least one of SNR, RSRP, RSRQ and RSSI. The eNB may select a relay UE based on the link quality.

According to another embodiment, an eNB may select a relay UE randomly or may select a relay UE candidate reported in the first place as a relay UE.

Embodiment for Management of D2D Link Between Target UE and Relay UE Candidate

Since a direct connection is not established between a relay UE candidate and a target UE, stability is lower than that of an eNB-to-UE link. Hence, if the target UE has mobility, a quality of the link between the target UE and the relay UE candidate may be degraded at a timing point for the relay UE candidate to respond to a received paging message. To solve such a problem, an embodiment of removing a target UE failing to be detected for a predetermined time from a neighbor UE list has been described.

In the following description, an embodiment for an out-of-coverage UE (hereinafter abbreviated OUE) to configure a relaying pair with one in-coverage UE (hereinafter abbreviated IUE) or two or more IUEs is described. OUE and IUE may be a target UE and a relay UE candidate, respectively.

A relaying pair may be determined according to a link status (e.g., measurement result) between UEs making a pair. The UEs belonging to the relaying pair exchange UE IDs of their own with each other and check a presence or non-presence of a counterpart by predetermined periods. If the UEs in the relaying pair determine that a mutual D2D communication is not possible, they terminate the connection of the relaying pair and configure another relaying pair. Hence, the IUE belonging to the relaying pair may respond to the paging for the OUE based on higher accuracy.

A provisional connection may be defined between UEs making a pair. The provisional connection may include a connection simpler than a connection for D2D data communication. For instance, an IUE (or OUE) detects a D2D signal sent by an OUE (or IUE), e.g., a discovery signal having a signal strength equal to or greater than a threshold. The IUE (or OUE) sends a provisional connection request message to the OUE (or IUE). The OUE of a provisional connection confirmed pair sends information related to UE-Identity of its own to the IUE. The OUE and IUE need to transceive a signal with other periodically to maintain the provisional connection and may exchange information on a periodic signal configuration. For instance, the information on the periodic signal configuration may include at least one of informations of a signal transmitted frame number, a subframe number, a transmission period, and a transmission resource.

If detecting a paging message for the IUE, the IUE forwards the paging message to the OUE and reports an eNB that a relaying is available. The IUE may receive allocation of data to be forwarded to the OUE and allocation of a resource required for D2D communication with the OUE from the eNB.

In case of using a relaying pair, reliability on a report is raised and overhead according to creation and management of a neighbor UE list can be reduced. Yet, a paging performed at a paging timing for the IUE to attempt detection may be possibly detected only. To solve it, according to one embodiment of the present invention, the IUE can monitor a paging timing of the OUE together with a paging timing of its own. Information for deriving the paging timing of the OUE may be exchanged in a provisional connection establishing process. On the contrary, the IUE forwards the information of the OUE making a pair with the IUE to the eNB and may then acquire information on the paging timing of the OUE from the eNB.

Meanwhile, the OUE may establish a provisional connection with each of a plurality of IUEs having different paging timings. Each of the IUEs having established the provisional connection with the OUE sends the QUE information on the paging timing of the corresponding IUE or information (e.g., SFN, DRX cycle length, and UEID (IMSI)) for deriving the paging timing. Therefore, based on this, the OUE can make a pair by selecting a plurality of IUEs of which paging timings fail to overlap with each other.

Embodiment of Relaying Paging

Embodiments for an IUE to replay a paging message sent by an eNB to an OUE are described as follows.

According to a first method, an IUE can send (page) SA and/or data for a relaying of a paging message to an OUE based on DFN (D2D subframe number) information in D2DSS sent by the IUE and an OUE ID in the paging message received from an eNB (e.g., a paging using SA, a paging using SA and data, etc.).

Parameters for determining a paging timing (e.g., paging frame, paging subframe) of the OUE may be defined in advance. At the paging timing of the OUE, the IUE may send SA or data (e.g., paging information) to the OUE.

If SA is sent at the paging timing of the OUE, a frequency domain resource for sending the SA may be defined in advance or acquired by blind detection. Thereafter, the IUE sends paging information to the OUE according to a general communication process.

If data is sent at the paging timing of the OUE, SA is sent in advance according to the general D2D communication process. Data may be sent at a paging timing after the SA. The paging timing after the SA may be determined based on DFN.

According to a second method, a new SA for a relaying of a paging is defined. For instance, a field indicating a presence or non-presence of a paging is newly defined in SA, or a reserved state in an existing field may be set for a usage of indicating a presence or non-presence of a paging. On a resource indicated by SA, a paging message of the OUE can be relayed. Meanwhile, the IUE may forward a resource for a response of the OUE to the paging message to the OUE using the SA.

Having acquired the relayed paging message, the OUE broadcasts or sends a response to the paging message to the IUE. If the OUE is unable to specify the IUE having relayed the paging message, the response to the paging message is preferably broadcasted. In order to indicate that a thing sent by the OUE is the response to the paging message, the OUE can insert a field indicating a paging response into the SA.

Meanwhile, in case that a plurality of OUEs relay the same paging message or perform D2D communication corresponding to a relaying of a paging message, a single frequency network based D2D transmission may be necessary for the OUE to receive the paging message more accurately. To this end, an eNB may indicate a resource and D2D contents (e.g., source ID, destination ID, SA contents, etc.) to be used for the relaying of a paging message. The indication made by the eNB may be forwarded to the IUE through higher layer signaling or in a manner of being contained in the paging message. If it is unable to specify an IUE to relay the paging message, the indication made by the eNB can be broadcasted within a cell through a paging or a cell-common signaling. If it is able to specify an IUE to replay the paging message, the indication may be forwarded by IUE-dedicated signaling.

The IUE can monitor a plurality of paging candidate resources (i.e., paging frame, paging subframe). Yet, the monitoring of a plurality of the paging candidate resources may be set in RRC Connected state only in consideration of battery consumption. For instance, the eNB signals paging candidate resources, on which a paging message for the OUEs is sent or a paging message is highly probable to be sent, to IUEs. The eNB may indicate a plurality of the paging candidate resources by designating a time/frequency domain resource or signaling parameters (e.g., cell specific paging cycle, UE specific paging cycle, UE ID, etc.) for deriving a paging timing (paging frame and subframe).

According to another method, if an IUE operates as a relay UE, the IUE can attempt detection of a paging message for all existing paging candidate resources. To this end, parameters (e.g., cell specific paging cycle, UE specific paging cycle, UE ID, etc.) common to paging candidate resources may be set.

UEs having received signaling of the paging candidate resources from the eNB or UEs performing a relaying operation may attempt paging message detection for the candidate resources signaled or predefined as well as for paging candidate resources of their own.

Moreover, if a paging message the IUE performing the relaying should send to the OUE is detected, the IUE can perform a transmission of the paging message more preferentially than other D2D signals. For instance, if a relay UE performing a commercial D2D transmission (e.g., advertisement, etc.) detects a paging message for an OUE, the relay UE may pause a D2D transmission already in progress for the purpose of advertisement and then perform a relaying of the paging message.

Structure of Apparatus According to Embodiment of the Present Invention

Figure 11:
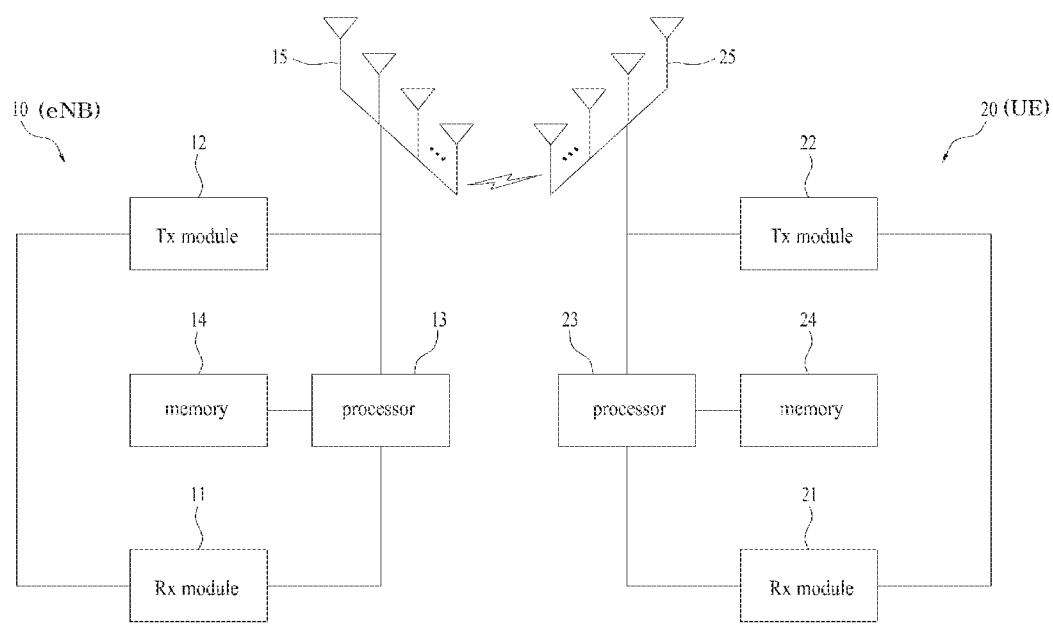
FIG. 11 is a diagram to illustrate a configuration of a transceiving device according to one embodiment of the present invention.

FIG. 11 is a diagram showing the configuration of a transmission point apparatus and a UE apparatus according to an embodiment of the present invention.

Referring to FIG. 11, the transmission point apparatus 10 according to the present invention may include a reception module 11, a transmission module 12, a processor 13, a memory 14 and a plurality of antennas 15. Since the plurality of antennas 15 is used, the transmission point apparatus may support MIMO transmission/reception. The reception module 11 may receive a variety of signals, data and information from the UE in uplink. The transmission module 12 may transmit a variety of signals, data and information to the UE in downlink. The processor 13 may control the overall operation of the transmission point apparatus 10.

The processor 13 of the transmission point apparatus 10 according to one embodiment of the present invention may process operations necessary for the embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 11, the UE apparatus 20 according to the present invention may include a reception module 21, a transmission module 22, a processor 23, a memory 24 and a plurality of antennas 25. Since the plurality of antennas 25 is used, the UE apparatus may support MIMO transmission/reception. The reception module 25 may receive a variety of signals, data and information from the eNB in downlink. The transmission module 22 may transmit a variety of signals, data and information to the eNB in uplink. The processor 23 may control the overall operation of the UE apparatus 20.

The processor 23 of the UE apparatus 20 according to one embodiment of the present invention may process operations necessary for the embodiments.

The processor 23 of the UE apparatus 20 may process information received by the UE apparatus 20 and information to be transmitted to an external device and the memory 24 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 11, the description of the transmission point apparatus 10 may also be equally applied to a device functioning as a downlink transmitter or an uplink receiver. The description of the UE apparatus 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital 1) signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The embodiments of the present invention mentioned in the foregoing description are applicable to various kinds of mobile communication.

What is claimed is:

1. A method for a first device-to-device (D2D) user equipment (UE) supportive of D2D communication to relay a communication of a second D2D UE, the method comprising:
   receiving, by the first D2D UE, a plurality of D2D signals from a plurality of D2D UEs;
   generating, by the first D2D UE based on the plurality of D2D signals, an out-of-coverage UE list including UE IDs of out-of-coverage D2D UEs which satisfied a D2D signal quality threshold from among the plurality of D2D UEs;
   detecting, by the first D2D UE, paging message transmitted by a base station (BS) for the second D2D UE, the paging message including a UE ID of the second D2D UE;
   determining whether the out-of-coverage UE list includes the UE ID of the second D2D UE included in the paging message; and
   transmitting, by the first D2D UE to the base station, a response to the paging message for the second D2D UE upon determining that the out-of-coverage UE list includes the UE ID of the second D2D UE, the response including information for reporting that the first D2D UE is able to relay communication between the base station and the second D2D UE.

2. The method of claim 1, wherein the UE ID of the second D2D UE included in the paging message is a first type identifier among a plurality of UE IDs allocated to the second D2D UE.

3. The method of claim 2, wherein detecting the paging message comprises:
   detecting a physical downlink control channel (PDCCH) masked with a second type identifier of the second D2D UE; and
   detecting the paging message including the first type identifier in a resource region allocated by the PDCCH.

4. The method of claim 1, wherein detecting the paging message comprises:
   monitoring paging messages for the out-of-coverage D2D UEs in a manner of overhearing, based on the UE IDs included in the out-of-coverage UE list.

5. The method of claim 2,
   wherein a paging timing for the first D2D UE is UE-specific, and
   wherein a paging timing for the second D2D UE is cell-specific or group-specific.

6. The method of claim 1, wherein the response of the first D2D UE further includes a result of measuring a D2D signal received from the second D2D UE.

7. The method of claim 6, wherein the result of measuring the D2D signal is used to select a relay UE for the second D2D UE among a plurality of relay UE candidates including the first D2D UE.

8. The method of claim 1, further comprising:
   establishing a provisional connection to the second D2D UE; and
   exchanging a D2D signal with the second D2D UE periodically to maintain the provisional connection.

9. The method of claim 8, wherein detecting the paging message comprises:
   receiving the paging message for the second D2D UE based on information on a paging timing of the second D2D UE acquired through the provisional connection.

10. The method of claim 1, further comprising:
    relaying the detected paging message to the second D2D UE through D2D communication with the second D2D UE.

11. The method of claim 1, further comprising:
    running a timer related to a validity of the out-of-coverage UE list,
    wherein the first UE deletes a UE ID of a specific UE from the out-of-coverage UE list, in response to a D2D signal of the specific UE being detected no more before the timer expires.

12. A first device-to-device (D2D) user equipment (UE) supportive of D2D communication, the first D2D UE comprising:
    a receiver;
    a transmitter; and
    a processor to:
    receive, through the receiver, a plurality of D2D signals from a plurality of D2D UEs;
    generate, based on the plurality of D2D signals, an out-of-coverage UE list including UE IDs of out-of-coverage D2D UEs which satisfied a D2D signal quality threshold from among the plurality of D2D UEs;
    detect a paging message transmitted by a base station (BS) for a second D2D UE, the paging message including a UE ID of the second D2D UE;
    determine whether the out-of-coverage UE list includes the UE ID of the second D2D UE included in the paging message; and
    transmit, through the transmitter to the base station, a response to the paging message for the second D2D UE upon determining that the out-of-coverage UE list includes the UE ID of the second D2D UE, the response including information for reporting that the first D2D UE is able to relay communication between the base station and the second D2D UE.

* * * * *